United States Patent
D'Aluisio et al.

[19]

[11] Patent Number: 5,979,924
[45] Date of Patent: Nov. 9, 1999

[54] CRANK ASSEMBLY FOR A BICYCLE

[75] Inventors: Christopher P. D'Aluisio, Bethel; Mario M. Galasso, Redding; Robert H. Humphries, Jr., Danbury, all of Conn.

[73] Assignee: Cannoncale Corporation, Georgetown, Conn.

[21] Appl. No.: 08/816,530

[22] Filed: Mar. 13, 1997

[51] Int. Cl.[6] .................................................. B62M 1/02
[52] U.S. Cl. .......................... 280/261; 280/259; 474/87; 474/88
[58] Field of Search ................................... 280/259, 260, 280/261, 236; 180/227; 474/77, 78, 73, 87, 89, 88, 158, 152, 165

[56] References Cited

U.S. PATENT DOCUMENTS

| | | |
|---|---|---|
| 465,475 | 12/1891 | Hardy . |
| 472,796 | 4/1892 | Moskowitz . |
| 484,857 | 10/1892 | Kempe . |
| 490,252 | 1/1893 | Jenkins . |
| 491,366 | 2/1893 | Mahoney . |
| 559,299 | 4/1896 | Matthern . |
| 569,636 | 10/1896 | Goettel . |
| 576,331 | 2/1897 | Tallman . |
| 582,208 | 5/1897 | Jennings . |
| 620,390 | 2/1899 | Wells . |
| 641,980 | 1/1900 | Lower . |
| 789,580 | 5/1905 | Trainor . |
| 846,033 | 3/1907 | Kidney . |
| 865,583 | 7/1907 | Fuller ........................................ 474/73 |
| 881,729 | 3/1908 | Smith . |
| 1,097,546 | 5/1914 | Harley . |
| 1,154,292 | 9/1915 | Cribbs . |
| 1,205,392 | 11/1916 | Parda . |
| 1,360,032 | 11/1920 | Schiffner . |
| 1,380,082 | 5/1921 | Schleder . |
| 1,485,682 | 3/1924 | Liese . |
| 1,535,714 | 1/1925 | Burke . |
| 1,551,412 | 8/1925 | Lopez . |
| 1,630,442 | 5/1927 | Makris ..................................... 280/261 |
| 1,826,565 | 10/1931 | Murase ...................................... 474/73 |
| 2,588,074 | 3/1952 | Riga et al. .............................. 280/238 |
| 5,102,155 | 4/1992 | Chou ....................................... 280/236 |
| 5,209,507 | 5/1993 | Domenge ................................ 280/261 |
| 5,577,749 | 11/1996 | Ross ........................................ 280/261 |

FOREIGN PATENT DOCUMENTS

| | | | |
|---|---|---|---|
| 167357 | 5/1934 | Switzerland .............................. 474/73 |
| 180568 | 1/1936 | Switzerland .............................. 474/73 |

*Primary Examiner*—Daniel G. DePumpo
*Attorney, Agent, or Firm*—Pennie & Edmonds LLP

[57] ABSTRACT

A crank assembly for a bicycle uses a plurality of auxiliary sprockets and chains to achieve high ratios of wheel speed to pedal-rotation speed. The compact crank assembly is especially well suited for use on full-suspension bicycles, as high gear ratios are attained without altering the normal size and layout of the main sprocket and drive chain of the bicycle. The auxiliary sprockets may be coupled by a simple axle or, alternatively, may be coupled by a rider-adjustable transmission to provide greater control over the gear ratio of the crank assembly.

7 Claims, 12 Drawing Sheets

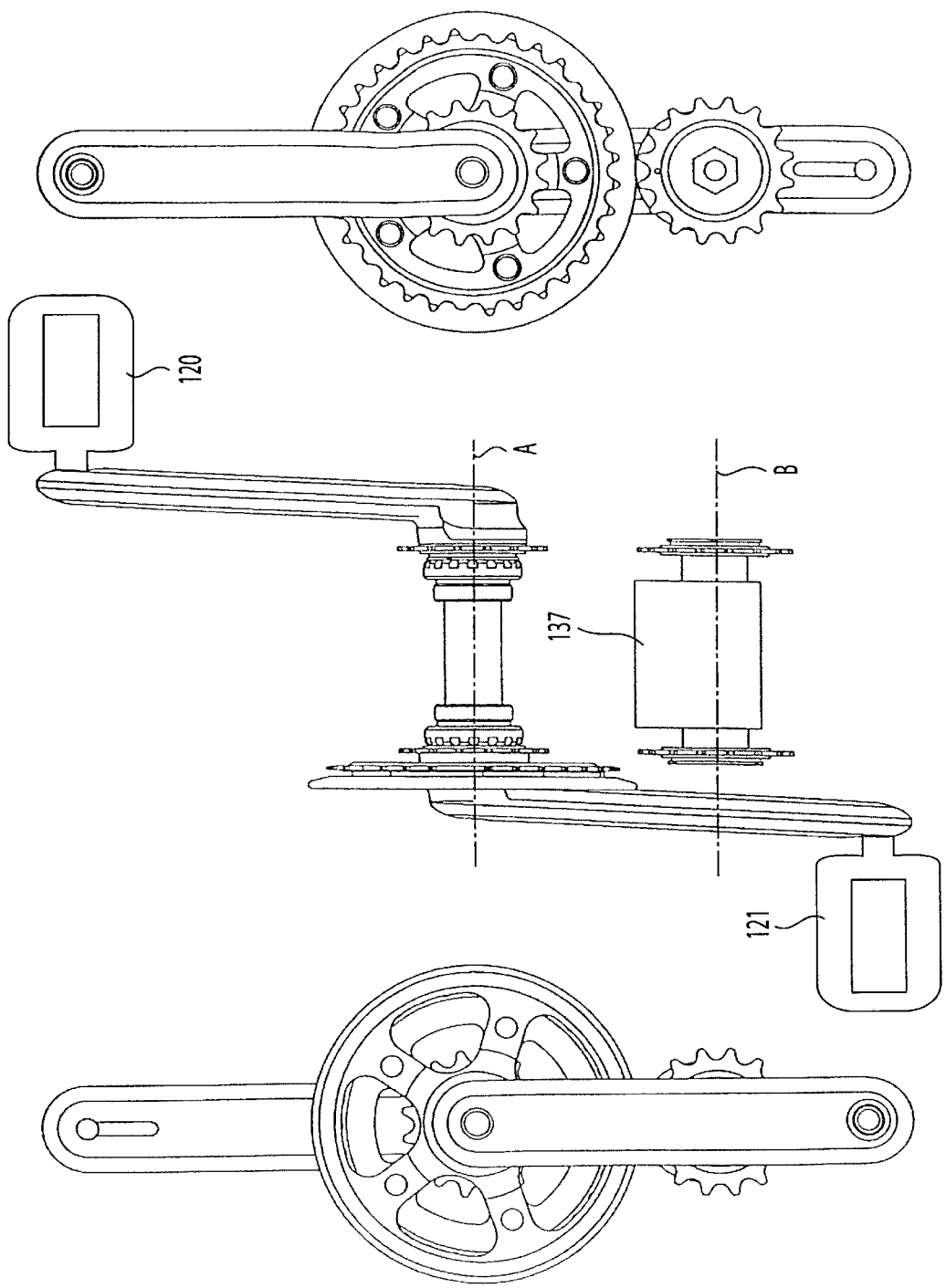

CRANK ASSEMBLY FOR A BICYCLE

FIELD OF INVENTION

The present invention relates generally to a bicycle crank assembly, having a plurality of sprockets, which provides the rider with an increased mechanical advantage without substantially increasing the overall size of the drive system. More specifically, the present invention relates to a multi-axle, multi-chain bicycle drive assembly which is suitable for use on a full-suspension bicycle.

BACKGROUND OF INVENTION

The use of different-sized sprockets between the pedals and the drive wheel of a bicycle in order to increase the speed of bicycle has been well-known for many years in the prior art. The standard multi-speed road bicycle employs one or more main or front sprockets coupled to the pedal crank arms, and one or more smaller rear or drive sprockets coupled to the axle of rear drive wheel. A single drive chain normally links the front sprocket to the rear sprocket, allowing the rider to propel the bicycle by operating the pedals. Typically, a gear-shifting device or derailleur is associated with the front sprocket and/or the rear sprocket, to allow the rider to manually shift the chain to a differently-sized sprocket in order to change the gear ratio of the drive system.

By providing a main sprocket of substantially larger circumference than the drive sprocket, a beneficial speed increase is achieved. As the circumference of the main sprocket is increased, the speeds attainable by the bicycle rider also increase. Thus, where a high-speed bicycle is desired, it is desirable to make the main sprocket as large as possible. There is a limit, however, to the practical size of the main sprocket. The main sprocket must not be so large that it contacts the ground or the other parts of the bicycle, as this would adversely affect the overall function of the bicycle. This limit on the size of the main sprocket is especially acute in the field of bicycles known as full-suspension bicycles. Full-suspension bicycles are designed for riding on rough terrain, often at high speeds in racing conditions. These bicycles are typically fitted with shock absorbers and other devices which deflect when the bicycle encounters shocks. Thus, full-suspension bicycles require increased ground clearance because of rough terrain, and because deflection of the shock-absorbing members may bring parts of the bicycle temporarily in closer proximity to the ground than the parts of a normal "road" bicycle.

In order to achieve higher speeds despite this limit to the size of the main sprocket, some prior art bicycles have employed a pair of intermediate sprockets between the pedal sprocket and the wheel sprocket. See, for example, U.S. Pat. No. 472,796 to Moskowitz, U.S. Pat. No. 5,577,749 to Ross, and U.S. Pat. No. 5,102,155 to Chou. These bicycles employ two drive chains—one chain linking the pedal sprocket to the first intermediate sprocket, achieving a first speed increase, and a second chain linking the second intermediate sprocket to the drive sprocket, achieving a second speed increase. In this way, these bicycles are able to achieve higher gear ratios than two-sprocket, single-chain bicycles.

The four-sprocket, two-chain drive system shown in the prior art, however, is not suitable for use on certain types of bicycles. For example, full-suspension bicycles, which are designed for the heavy shocks and loads that are experienced when riding on rough terrain, cannot use the prior art four-sprocket, two-chain drive systems. This is because the full-suspension bicycle is very carefully designed around the size and position of the main sprocket and the drive chain of the drive system. As explained above, the bicycle has shock absorbers and other elements which are designed to yield in order to absorb bumps and shocks, and the acceptable amount of deflection is limited by the ground clearance required for the main sprocket. Thus, it is desirable for the main sprocket of a full-suspension bicycle to be compact.

Furthermore, the design of a full-suspension bicycle, like most bicycles, depends on a substantially constant distance between the main sprocket and the drive sprocket in order to function properly. This distance must remain fairly constant in order to keep a constant tension in the drive chain. If the rear wheel and drive sprocket were to move just slightly closer to the main sprocket, the drive chain would become loose and the drive system could cease to function properly. If the drive sprocket moves away from the main sprocket, the drive chain may become prohibitively tight, interfering with the function of the drive system and possibly breaking the chain. These problems are central to the design of a full-suspension bicycle, because although it is desirable to allow controlled deflection of various parts of the bicycle in order to absorb shocks, the distance between the main sprocket and the drive sprocket must remain substantially constant.

It is desirable for a full-suspension bicycle to have a deflection point between the rear wheel and the main frame, to absorb rear-wheel shocks. As can be seen in FIGS. 2a, 2b and 8, this is accomplished without changing the distance between the main sprocket and the rear sprocket by allowing the rear wheel forks to rotate about pivot points X and Y while the shock is absorbed by shock absorber Z.

The multi-sprocket high speed bicycle drive systems shown in the prior art are not suitable for use on such a full-suspension bicycle. For instance, the one pictured in U.S. Pat. No. 472,796 to Moskowitz shows an intermediate sprocket located above the rear wheel. Clearly, any substantial deflection of the rear wheel with respect to the main frame of the bicycle would cause unacceptable slackness in the chains of this drive system. Similarly, U.S. Pat. No. 5,102,155 to Chou shows an intermediate sprocket located between the main sprocket and the rear wheel which would also be ineffective during a deflection of the rear wheel.

The solutions disclosed in the prior art are also not easily adjustable by the bicycle user. The large intermediate sprockets must be detached and replaced with different sized sprockets in order to change the gear ratio of the drive system. Then the chains must be re-fitted, as the differently-sized sprockets will require chains of different lengths to achieve the required chain tension.

Another problem with the prior art solutions to the multiple-sprocket high-speed bicycle problem is that they are aesthetically unpleasing. Bicycle consumers and enthusiasts are accustomed to the traditional bicycle drive system's appearance, which consists of a main sprocket which is connected via a chain to a relatively smaller drive sprocket. Large intermediate sprockets clearly visible elsewhere on the bicycle frame are not consistent with this compact style.

Thus, there is a need for a high-speed bicycle drive system which uses a normally-sized main sprocket, which is aesthetically pleasing, which is easily adjustable by the bicycle user to achieve a wide variety of gear rations, and which is suitable for use with a full-suspension bicycle.

SUMMARY OF THE INVENTION

The present invention relates to a bicycle drive assembly having the following elements: a pair of pedals and crank arms coupled with a first auxiliary sprocket, a first chain linking the first auxiliary sprocket to a second auxiliary sprocket, an axle or a transmission coupling the second auxiliary sprocket to a third auxiliary sprocket, a second chain linking the third auxiliary sprocket to a fourth auxiliary sprocket, a main sprocket coupled to the fourth auxiliary sprocket, and a third chain linking the main sprocket to a drive sprocket which is coupled with the rear wheel of the bicycle.

BRIEF DESCRIPTION OF THE DRAWINGS

FIG. 3a is a right-side view of an embodiment of the present invention;

FIG. 3b is a top view of an embodiment of the present invention;

FIG. 3c is a left-side view of an embodiment of the present invention;

DETAILED DESCRIPTION OF THE INVENTION

Figure 1A:
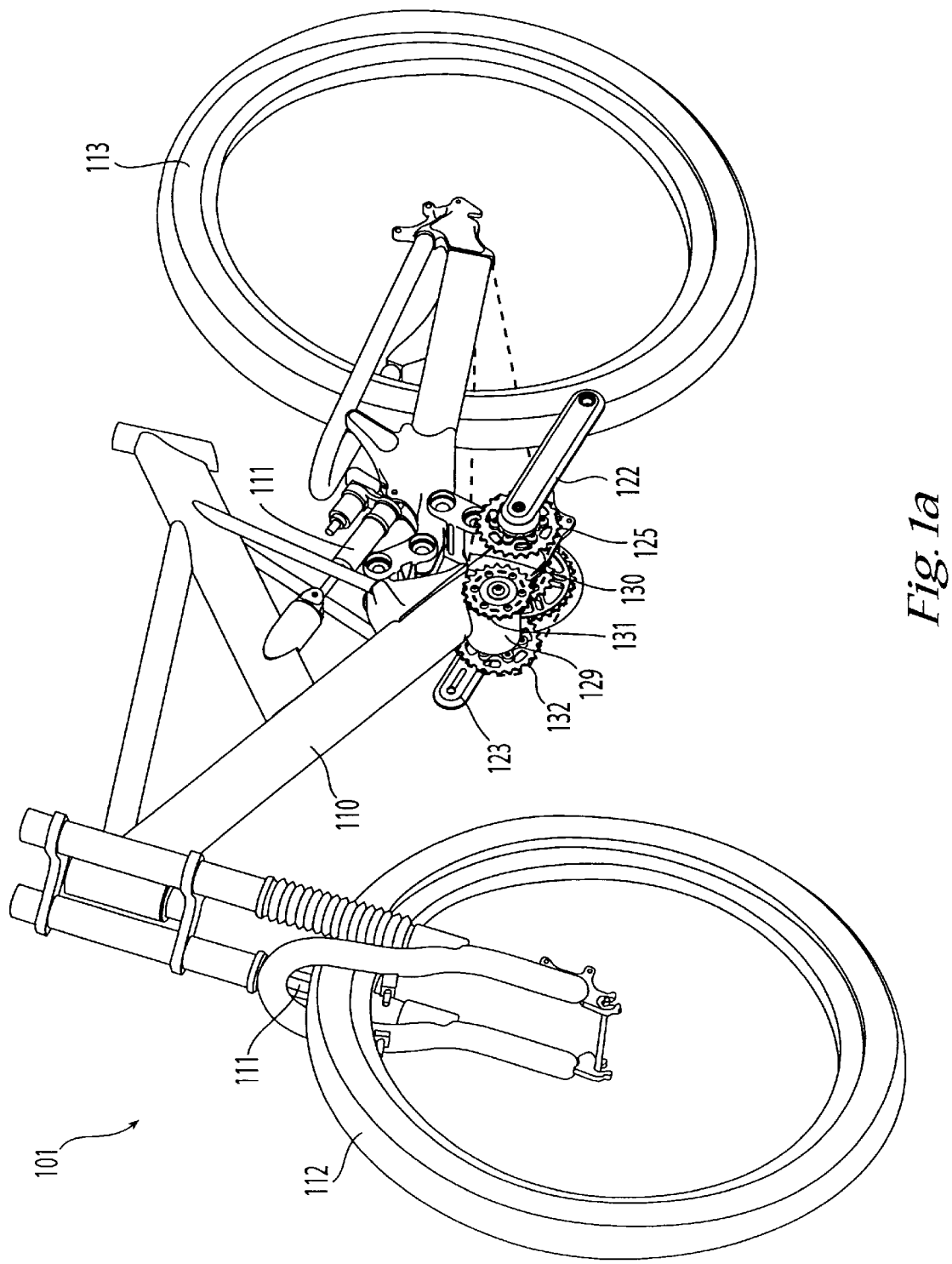
FIG. 1a is a left-side perspective view of an embodiment of the present invention.
Figure 1B:
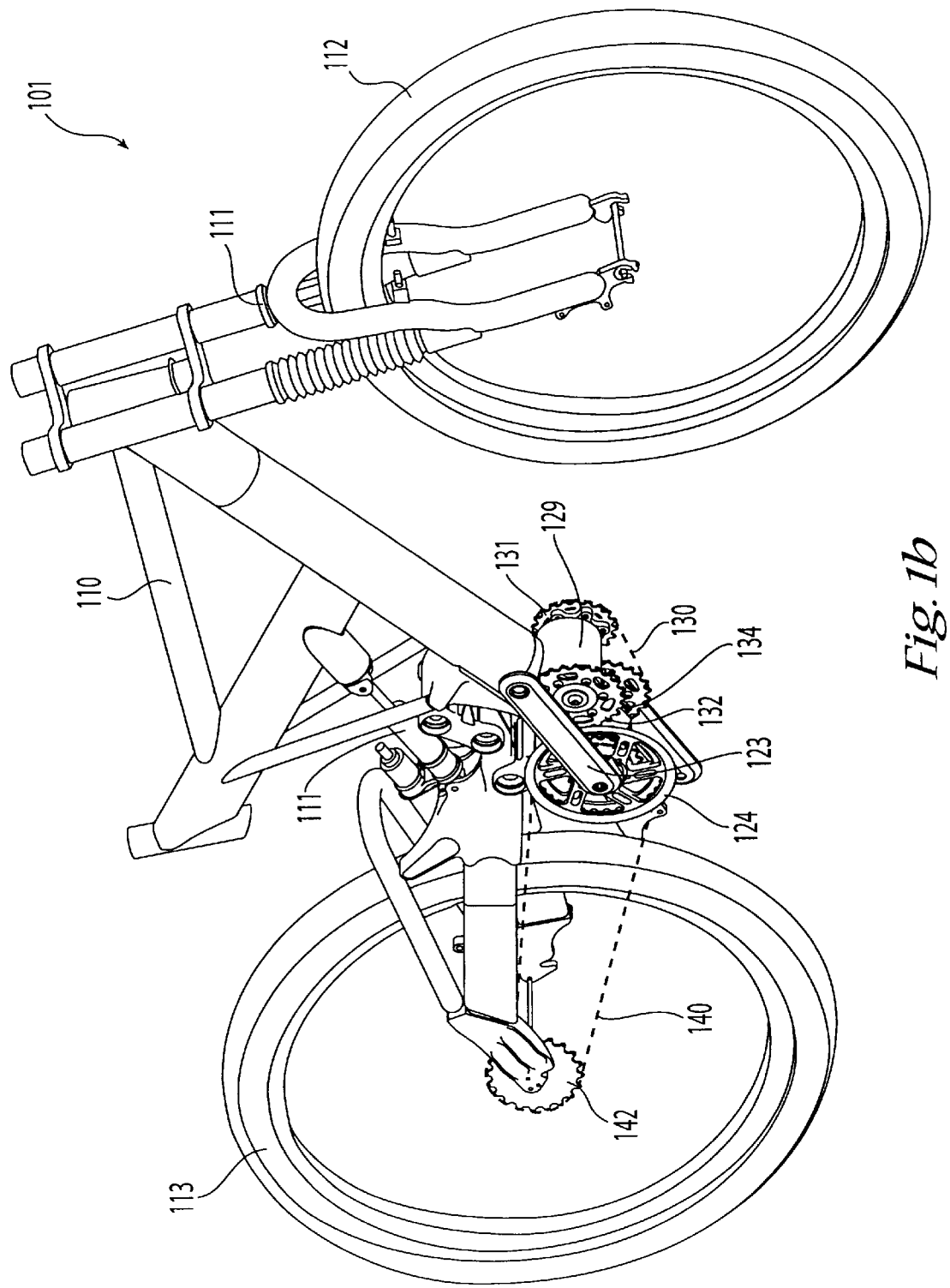
FIG. 1b is a right-side perspective view of an embodiment of the present invention.
Figure 2A:
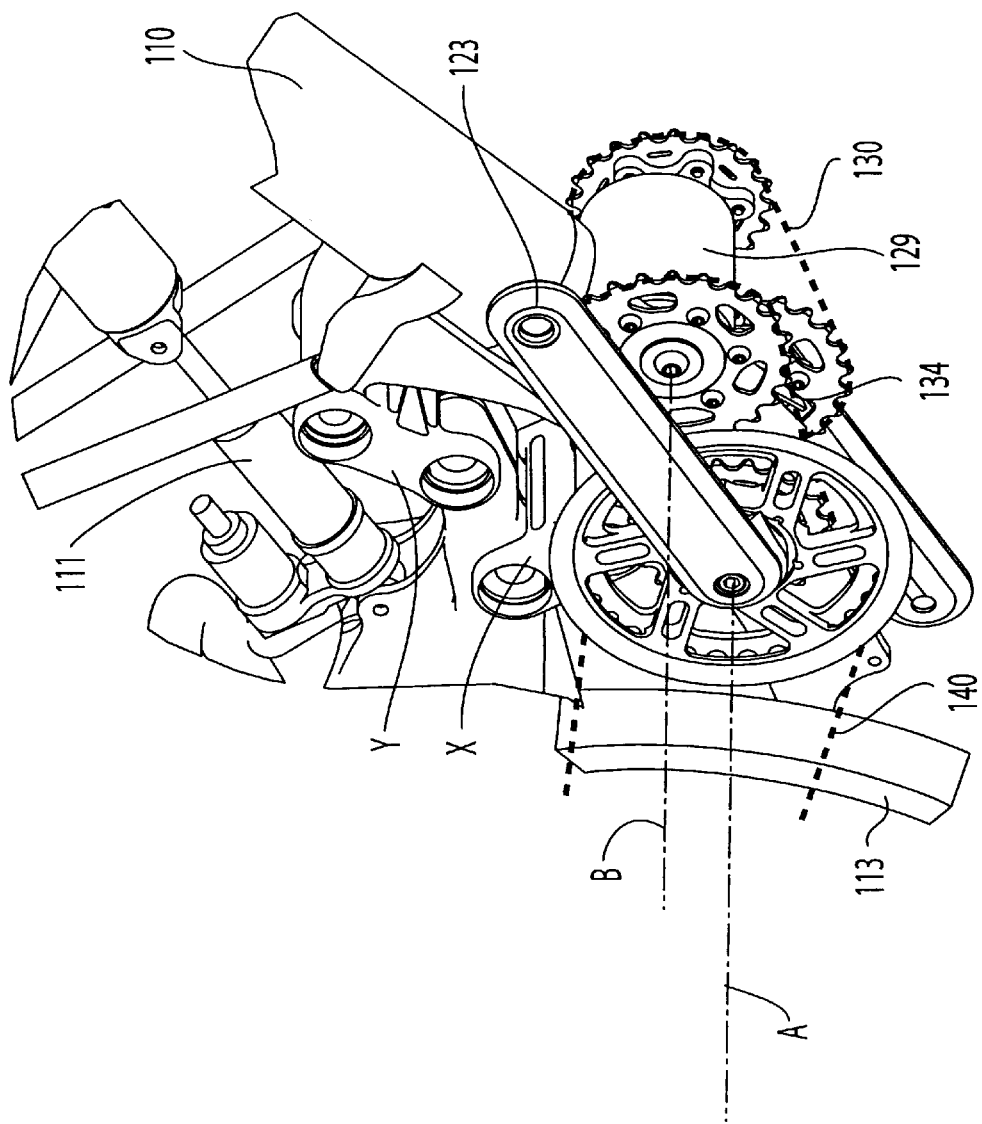
FIG. 2a is a right-side close-up perspective view of an embodiment of the present invention.
Figure 2B:
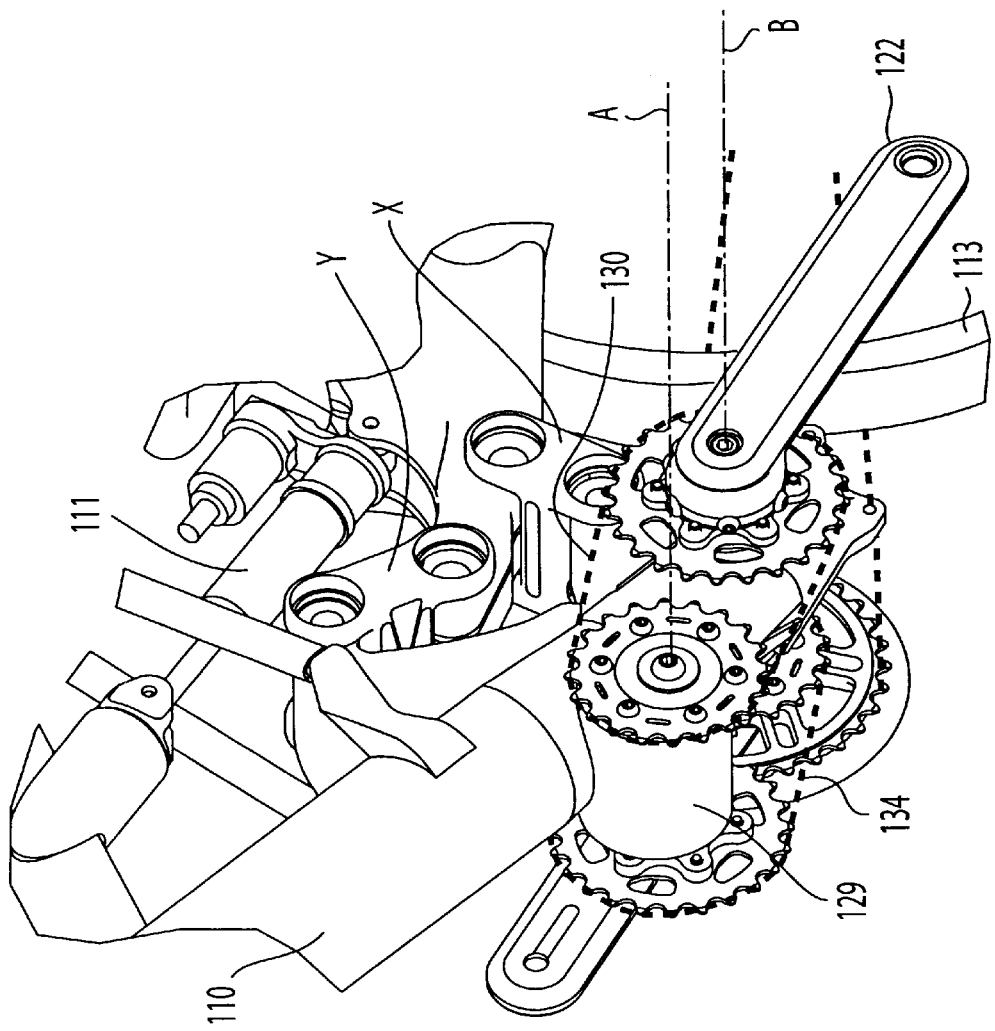
FIG. 2b is a left-side close-up perspective view of an embodiment of the present invention.

Referring more particularly to the drawings, FIGS. 1a–3c depict a preferred embodiment of the present invention. invention. FIGS. 1a and 1b show a full suspension bicycle 101 comprising frame 110, front wheel 112, rear wheel 113, and shock absorbers 111. The drive assembly of bicycle 101 can be seen in FIGS. 1a and 1b, and in more detail in FIGS. 2a–3c.

Figure 4:
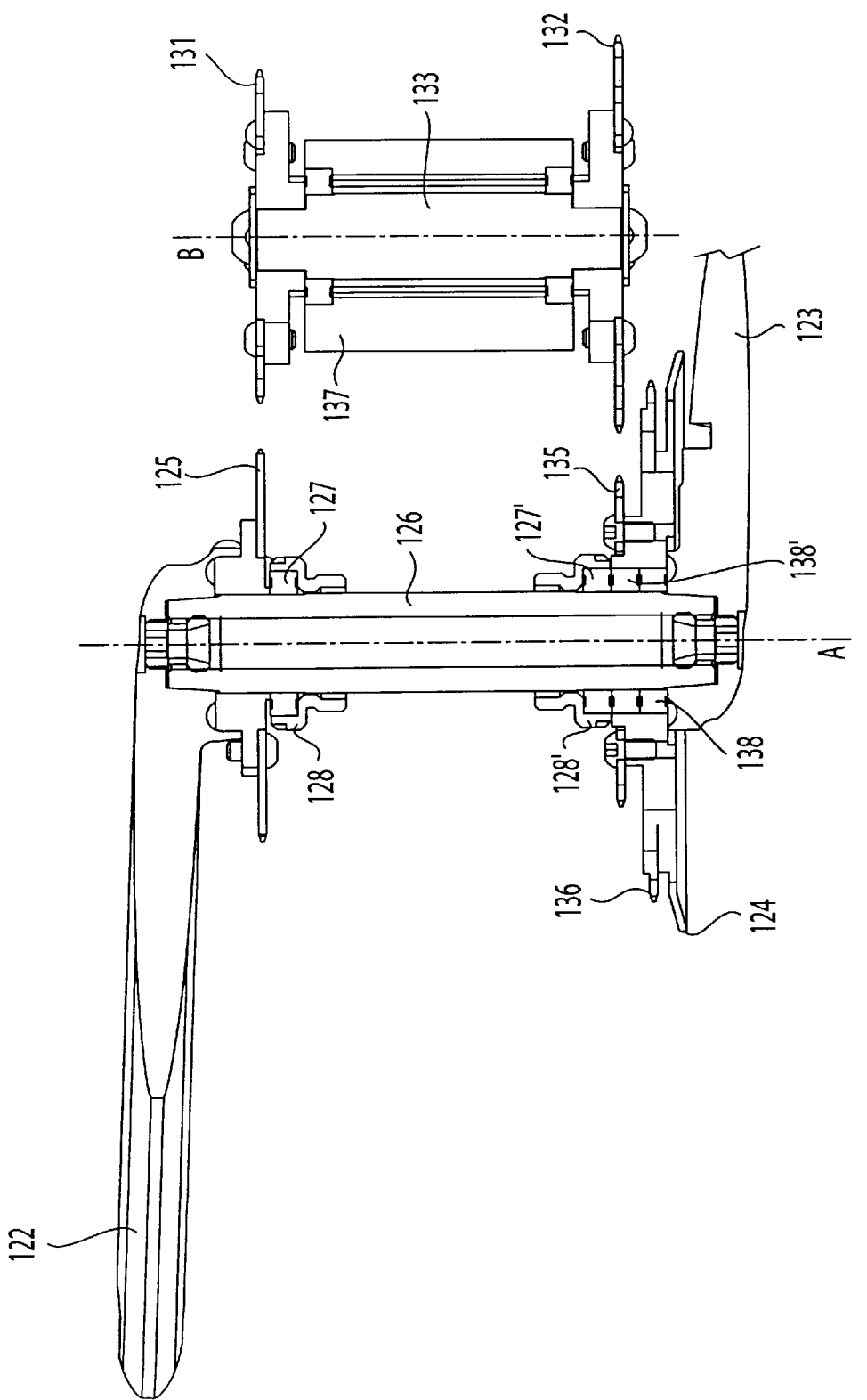
FIG. 4 is a cross-sectional view of part of the present invention.
Figure 5:
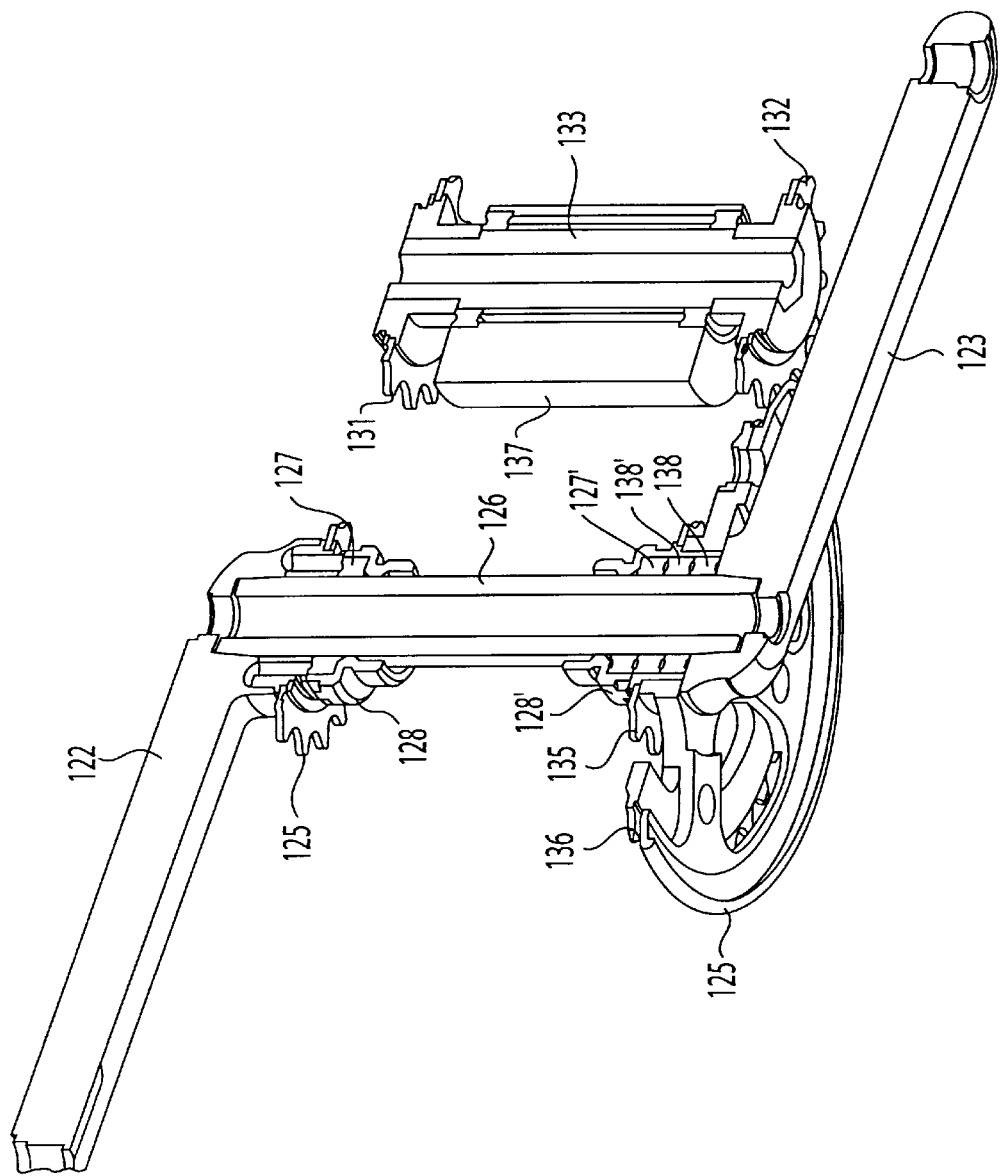
FIG. 5 is a perspective cross-sectional view of part of the present invention.
Figure 6D:
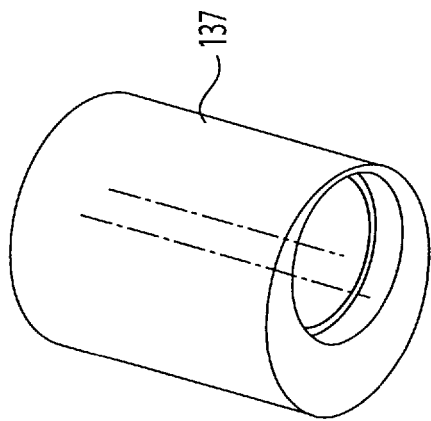
FIG. 6d is a perspective view of the adjustment housing which comprises part of the present invention.
Figure 6A:
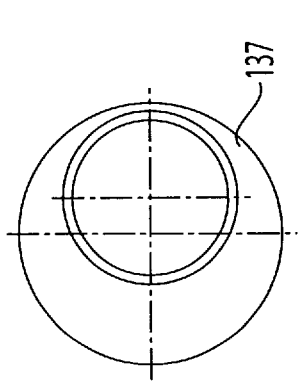
FIGS. 6a–6c are side views of an adjustment housing which comprises part of the present invention.
Figure 6B:
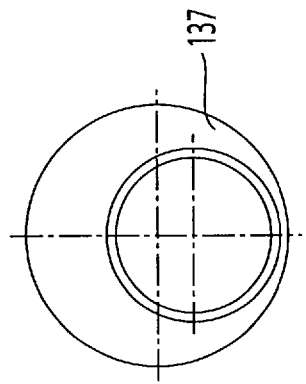
Figure 6C:
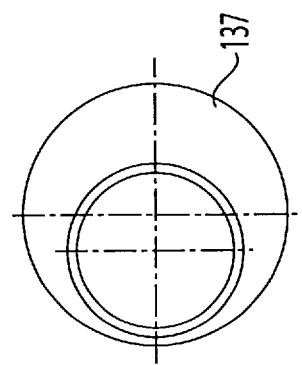
Figure 7:
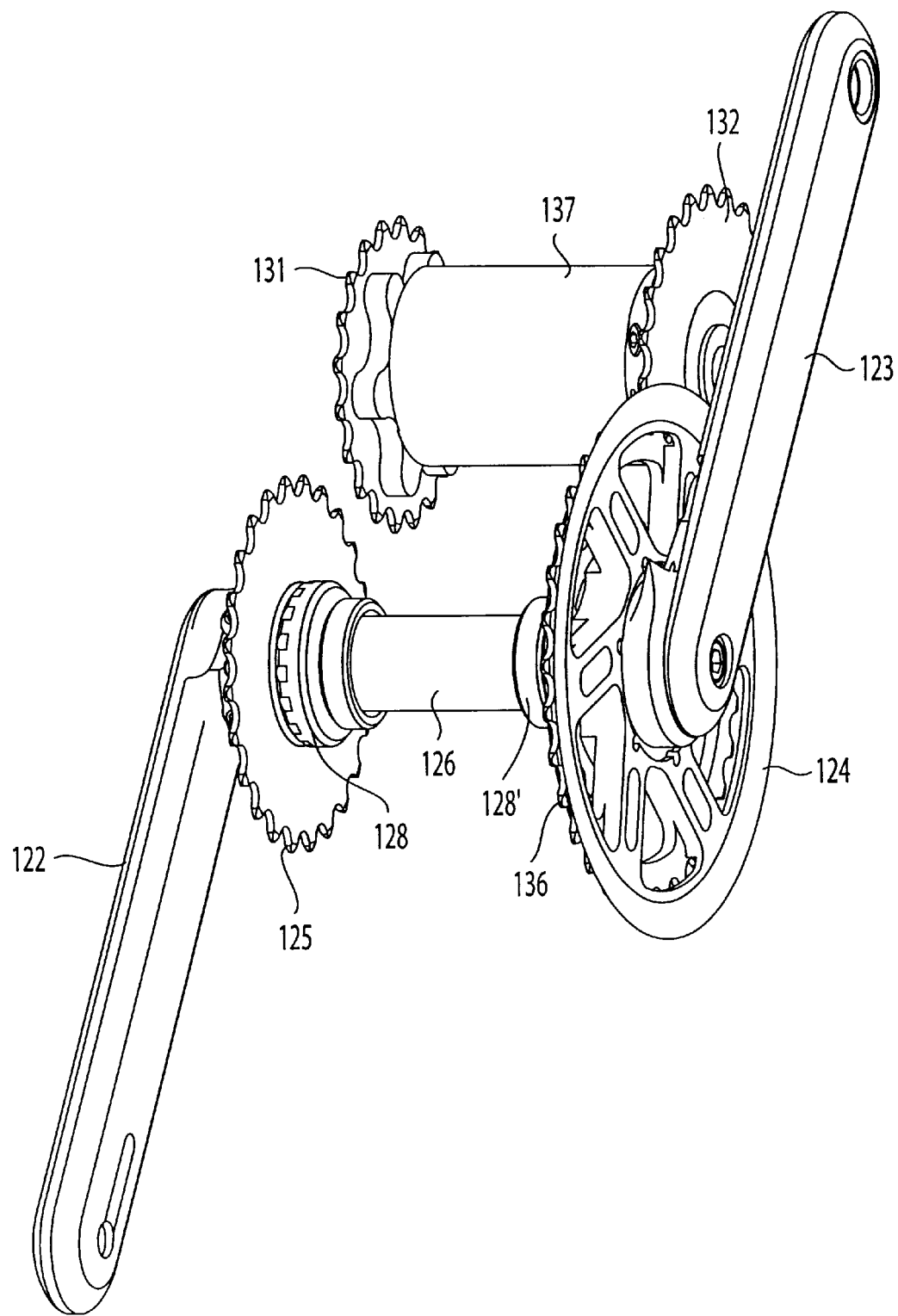
FIG. 7 is a perspective view of part of the present invention.
Figure 8:
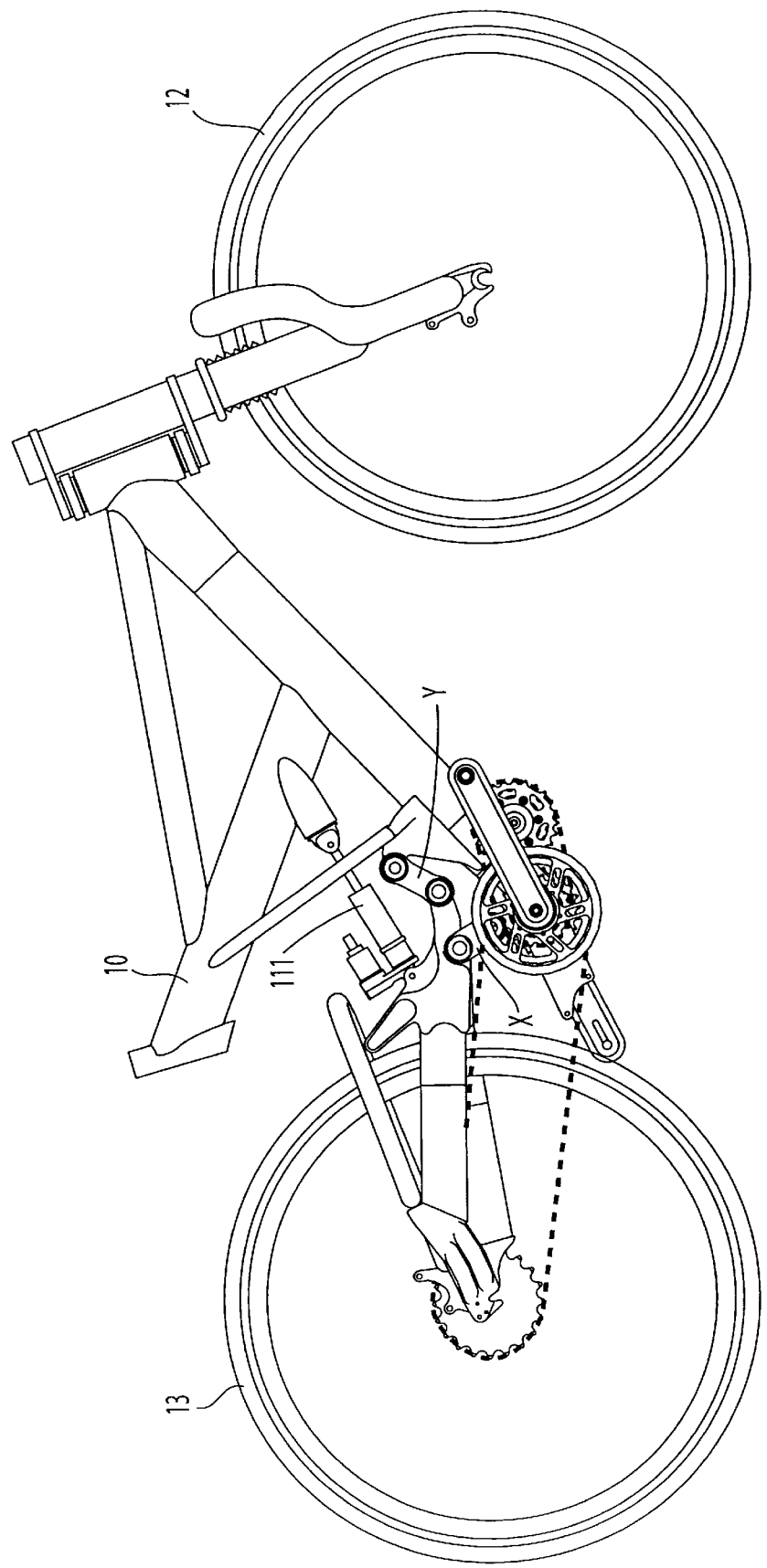
FIG. 8 is a right-side view of an embodiment of the present invention.

The bicycle rider operates the bicycle by pushing left and right pedals 120, 121 in a circular motion, and the rider's motions are translated via left and right crank arms 122, 123 and the first axle 126 to cause the rotation of the first auxiliary sprocket 125. The first auxiliary sprocket 125 rotates about first axis A upon first axle 126, as shown in FIGS. 4-5. First axle 126 rotates upon first bearings 127, 127'.

The first auxiliary sprocket 125 is linked to a second auxiliary sprocket 131 by first chain 130, as shown in FIGS. 1a–2b. Thus, the rotation of the first auxiliary sprocket 125 causes the simultaneous rotation of the second auxiliary sprocket 131. The second auxiliary sprocket 131 is located in tube 129 which is a part of frame 110, and rotates about second axis B. As shown in FIGS. 1a–2b, the second auxiliary sprocket 131 is located slightly forward of the first auxiliary sprocket 125. It will be recognized by those skilled in the art, however, that the intermediate gears and second axis B may be located elsewhere with respect to the first auxiliary sprocket and first axis A. Although in FIGS. 1a–5 the second auxiliary sprocket is of the same circumference as the first auxiliary sprocket, it is important to note that it may be beneficial to provide a second auxiliary sprocket of a smaller circumference than the first auxiliary sprocket. This difference in circumference results in an increased gear ratio for the bicycle drive system, and will be explained in greater detail below.

The second auxiliary sprocket 131 is coupled to the third auxiliary sprocket 132, which also rotates about second axis B, by axle 133 located in tube 129. Although the third auxiliary sprocket in FIGS. 1a–5 is of the same circumference as the second auxiliary sprocket, it may be desirable to provide a third auxiliary sprocket which is larger than the second auxiliary sprocket. As explained in greater detail below, this size difference enhances the gear ratio of the drive system.

In alternative embodiments of the present invention, the second and third auxiliary sprockets 131, 132 may be linked by a transmission contained within the tube 129 rather than by a simple axle. This would allow the rider to alter the relative speed of the second and third auxiliary gears 131, 132. The transmission may be discretely variable among a finite number of gears, such as the one disclosed in U.S. Pat. No. 4,716,777 to Hartmann, or it may be continuously variable among an infinite number of gear ratios, such as the one taught by U.S. Pat. No. 5,318,486 to Lutz. The disclosures of these patents are hereby incorporated by reference.

Figure 9:
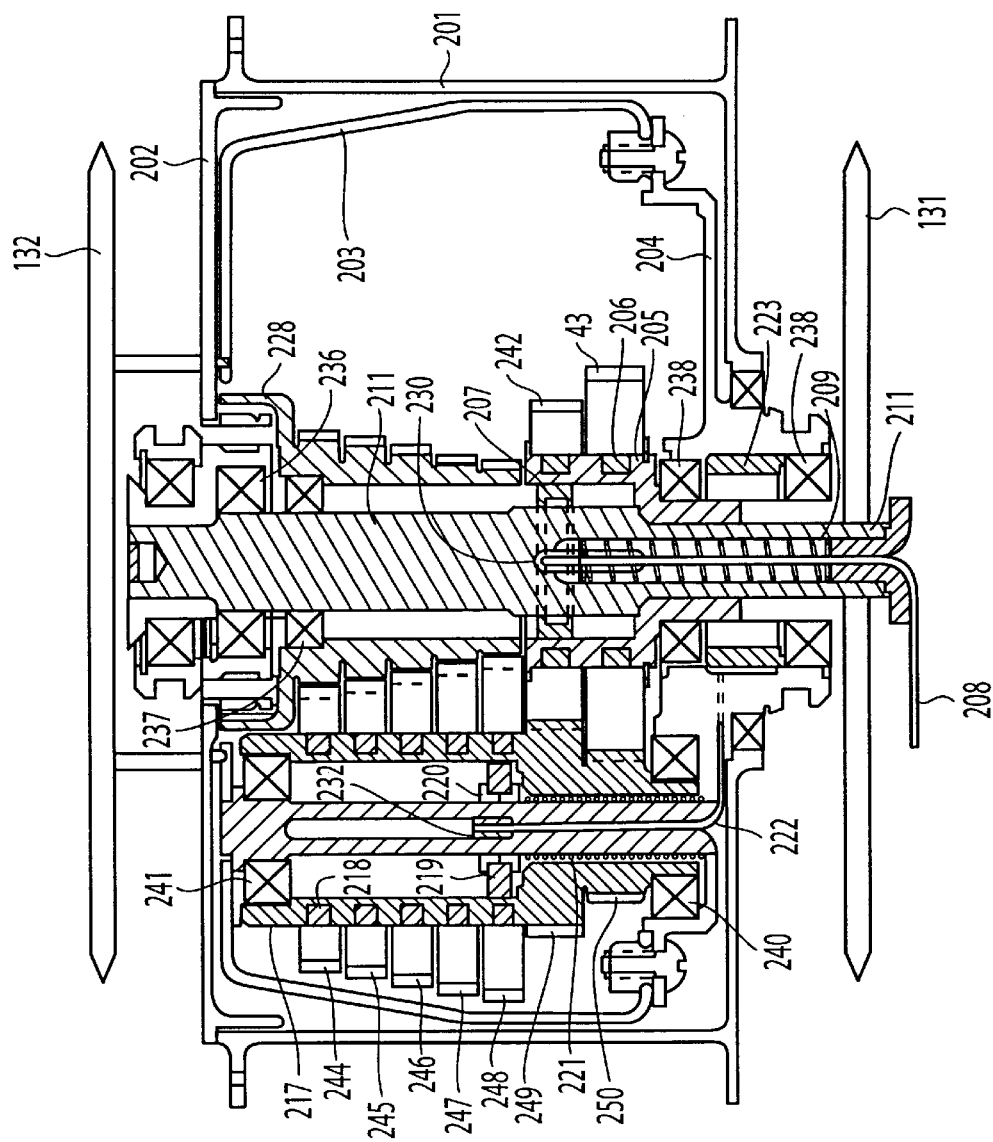
FIG. 9 is a cross-sectional view of a discretely-adjustable transmission which comprises part of an alternative embodiment of the present invention.

A cross-sectional view of a discretely variable transmission such as the one disclosed in U.S. Pat. No. 4,716,777 to Hartmann is shown in FIG. 9. The transmission is located within tube 129 (not shown), and includes a transmission hub 201, a hub driving plate 202 which is coupled to third auxiliary sprocket 132, a gear case 203, a gear case closing plate 204, a drive-gear-carrier 205, a split ring 206, a drive gear selector 207, a selector actuation cable 208, a return spring 209, and a drive shaft 211 which is coupled to the second auxiliary sprocket 131. The gear case closing plate 204 is supported by a pair of ball bearings 238.

The two halves of the split ring 206 are installed in each pair of circumferential cutouts in the drive-gear carrier 205, with the outside diameter of the split ring 206 matching the outside diameter of the drive-gear-carrier 205. An involute gear 242 is installed over the split ring 206 in the left cutout, and an involute gear 243 is installed over the split ring 206 in the right cutout. The inside diameter of the gears 242 and 243 is a slip fit on the outside diameter of the drive-gear-carrier 205, so that the gears and split rings slide freely on the carrier.

The drive gear selector 207 is installed in the annular space between the outside diameter of the drive shaft 211 and the inside diameter of the drive-gear-carrier 205. Four radial projections on the selector 207 slide in axial slots in the drive-gear-carrier 205 and engage an internal tooth form on the inside of the split ring 206 in the plane of which the selector 207 is located. The selector 7 thus transfers the torque from the drive-gear-carrier 205 through the split ring 206 to the drive gear in the plane of the gear in which it is located.

The axial position of the drive gears 242 and 243 is maintained by a shoulder on the left end of the drive-gear-carrier 205, a washer between the gears, and a snap ring on the right end of the carrier 205. The axial position of the drive gear selector 207 is controlled by the shift bar 230, the cable 208, and the return spring 209. The bar 230 fits through a slot in the drive shaft 211, with its ends captive between shoulders on the selector 207. The spring 209 forces the bar 230 to the left end of the slot. The spring force is resisted by cable 208, one end of which is captive in the bar 230. From the bar 230, the cable 208 passes out of the transmission to a user-adjustable shift mechanism located elsewhere on the bicycle frame. By manipulating the shift mechanism, the bicycle rider can adjust the tension in cable 208, thereby moving the drive gear selector 207 from one to the other of the drive gears 242 and 243.

A slotted pin 229 is installed parallel to the drive shaft 211 in the gear case 203. The slotted pin 229 is installed in three locations 120 degrees apart and the left end supported in the gear case 203 is square in a square hole so that the pin 229 is restrained from rotating. The right end of the pin 229 is supported in the gear case closing plate 204, as shown in FIG. 9. The left end of an idler shaft 217 is supported on a ball bearing 241 seated on the slotted pin 229. The right end of the idler shaft 217 is supported inside a ball bearing 240 which is seated in the gear case closing plate 204.

Two gears 249 and 250 are rigidly fixed on the idler shaft 217 and are in constant mesh with the drive gears 242 and 243, respectively. A split ring 218 is installed in each of five circumferential cutouts in the idler shaft 217 and the five idler gears 244, 245, 246, 247 and 248 are installed over the split rings 218. The inside diameter of the idler gears is a slip fit on the outside diameter of the idler shaft 217 so that the gears rotate freely relative to the idler shaft.

The split ring 218 has four radial projections which key it to the gear installed over it. An idler gear selector 219 has four radial projections which slide in axial tracks in the idler shaft 217. The depth of the tracks in the idler shaft 217 is preferably limited to two thirds its thickness so that they do not impair its torsional integrity. A tooth form on the ends of the projections on the idler gear selector 219 matches an internal tooth form on the split rings 218. The gear selector 219 thus transfers torque from the idler shaft 217 to the gear in the plane of which it is located, while the other four gears slide freely on the idler shaft 217.

As seen in FIG. 9, the axial position of the gear selector 219 is controlled by a split collar 220, a flanged bar 232, a cable 222, and a return spring 221 which is installed over the slotted pin 229. The idler gear selector 219 rotates freely between the two halves of the split collar 220. The flanged bar 232 is installed in the slotted pin 229 inside the left half of the split collar 220 with flanges on the ends of the bar 232 engaging the left flange on the split collar 220. The force from the spring 221 is reacted by tension in the cable 222, one end of which is fixed in the flanged bar 232, and the other end of which is clamped in a winch 223 located between the bearings 238 supporting the gear case closing plate 204. A winch actuation cable (not shown) runs from the winch 223 to a user-adjustable shift mechanism elsewhere on the bicycle frame.

As shown in FIG. 9, the right side of the transmission hub 201 is supported on a ball bearing 39 seated on the gear case closing plate 204. The closing plate 204 is attached to the bicycle frame 110 to prevent the gear case from rotating.

The left side of the transmission hub 201 is supported by the transmission hub driving plate 202, which is supported by a ball bearing 236 seated on the drive shaft 211. Each of five gears rigidly fixed to the free-wheel assembly 228 is in constant mesh with one of the five idler gears freely rotating on each of the three idler shafts 217. Torque from the free-wheel assembly 228 is transferred to the transmission hub drive plate 202. The transmission hub drive plate 202 is coupled with the third auxiliary sprocket 132, which thus rotates at a faster rate than the second auxiliary sprocket 131. The amount of the speed increase depends on the gear ratio of the transmission, which is determined by the rider in manipulating the shift mechanisms, which control which of the transmission's gears are engaged.

A continuously-variable transmission, such as the one disclosed in U.S. Pat. No. 5,318,486 to Lutz and shown in FIG. 10, may also be used with the present invention. This transmission includes a transmission axle 1 which is stationarily secured to the frame of the bicycle and a transmission shell 9 is rotatably mounted upon the axle 1 over ball bearings 3 and 5. The center line of the axle forms the axis 4 around which the shell 9 rotates. The third auxiliary sprocket 132 is coupled to, and thus rotates with, the shell 9. Axially laterally to the shell 9 the axle 1 has rotatably mounted on it by means of a ball bearing 15 a driver or actuator 13, attached to the second auxiliary sprocket 131. The shell 9 is securely connected with a sleeve ring 81 which, for assembly reasons, cannot be fitted until after the insertion of a ball friction gear 17 in the shell 9.

The shell 9 and third auxiliary sprocket 132 are rotatably mounted on the axle 1 rigidly connected with the frame in the following manner:

On the side of the transmission situated opposite the second auxiliary sprocket 131, a ball carrier plate 25 on the control side is pressed together with a fixed cone 29 by a nut 83 against a projection 87 and in this manner connected solid in rotation with the hub axle 1. The ball bearings 3 and 5 designed as angular ball bearings rotatably connect the assembly of shell 9 and sleeve ring 81, the ball bearing 5 bearing upon the driver 13 which, again, is mounted on an adjusting cone 31. This adjusting cone 31 is screwed onto the thread of the hub axle 1 and is countered by a nut 85. It will be easy to see that the rotating parts, shell 9, and driver 13 are mounted both on the fixed cone 29 joined solid in rotation with the hub axle 1 and on the adjusting cone 31, and that the setting free from play of the angular ball bearings is effected by means of the adjusting cone 31.

The ball friction gear 17 is steplessly adjustable and includes the ball carrier plate 25 on the control side and a ball carrier plat 27 on the second auxiliary sprocket side, of which the ball carrier plate 25 on the control side is rigidly solid in rotation with the axle 1, as already described. The two ball carrier plates 25 and 27 are joined together by means of three spacer blocks 26 and are rigidly screwed together to form a unit rigid in rotation. The ball carrier plates 25 and 27 have radial grooves 43 and 45 with a width which corresponds to the diameter of the ball bearings 41 which are guided by the groove flanks 43a and 45a. The grooves 43 and 45 are situated axially precisely facing each other, as a result of which ball axles 37 with axle pins protruding at both ends can be passed, balls 35 being mounted on them solid in rotation. Such a ball friction gear 17 carries on the periphery at least three, possibly, however, four or five of these balls 35, of which one is shown in section in FIG. 10. The balls 35 roll on correspondingly concavely curved inner periphery 32 of a single guide ring 33 which is rotatably mounted around the axis 4 in the shell 9. By the axial pressing of a drive ring 51 onto the balls 35 toward the second auxiliary sprocket side, and of a driven ring 55 onto the balls 35 towards the control side, the balls 35 are pressed radially outward against the guide ring 33. As a result of this triangle of forces, the balls 35 are in a static state of equilibrium.

The drive ring 51, a drive sleeve 49 and the driver 13 all take part in bringing about the axial forces onto the balls 35. The drive ring 51, which is in frictional connection with the balls 35 is coupled solid in rotation and axially secured with the driving sleeve 49 through a longitudinal toothing 53. The entrainment of the driving sleeve 49 by the driver 13 is effected by means of a screw thread 47, preferably a flat thread, which has a pitch which produces a displacement force proportional to the driving torque in the direction of the second auxiliary sprocket 131 ensuring a slip-free frictional locking to the balls 35. In the case of the introduction of the torque the axial force acting in the direction of the second auxiliary sprocket 131 is therefore produced by the right-hand thread 47 and transmitted by the driving sleeve 49 along the longitudinal toothing 53 onto the driving ring 51. At the places of contact with the balls 35 additional radial forces are produced which are taken up by the guide ring 33 and passed on to the driven ring 55, where, again, there arises an axial force component in the direction of the second auxiliary sprocket 131 which is led back over an axial bearing 19 onto the drive 13, results in a closed circuit of inner forces. A pressure spring 57 has the task of tensioning the drive sleeve 49 against the axial bearing 19 in such a manner that the drive ring 51 is pulled in the direction towards the balls 35, as a result of which there arises in the ball friction gear 17 an absence of play as well as a small pretensioning force which is necessary for its reliable response when starting the vehicle.

The driven ring 55 is at its second auxiliary sprocket side connected with a sun wheel 59 by means of a tubular body 58 in integral manner. The sun wheel 59 forms part of a planetary gear 21 the planet wheels 61 of which are rotatably mounted by means of bolts 63 on the driver 13. By this means the driver 13 acts at the same time as a planet wheel carrier in this planetary gear 21. Also belonging to the planetary gear 21 is a ring gear 69 which is rotatably mounted on the tubular body 58 of the driven ring 55 and carries on its outer diameter a pawl free-wheeling clutch 23.

Figure 10:
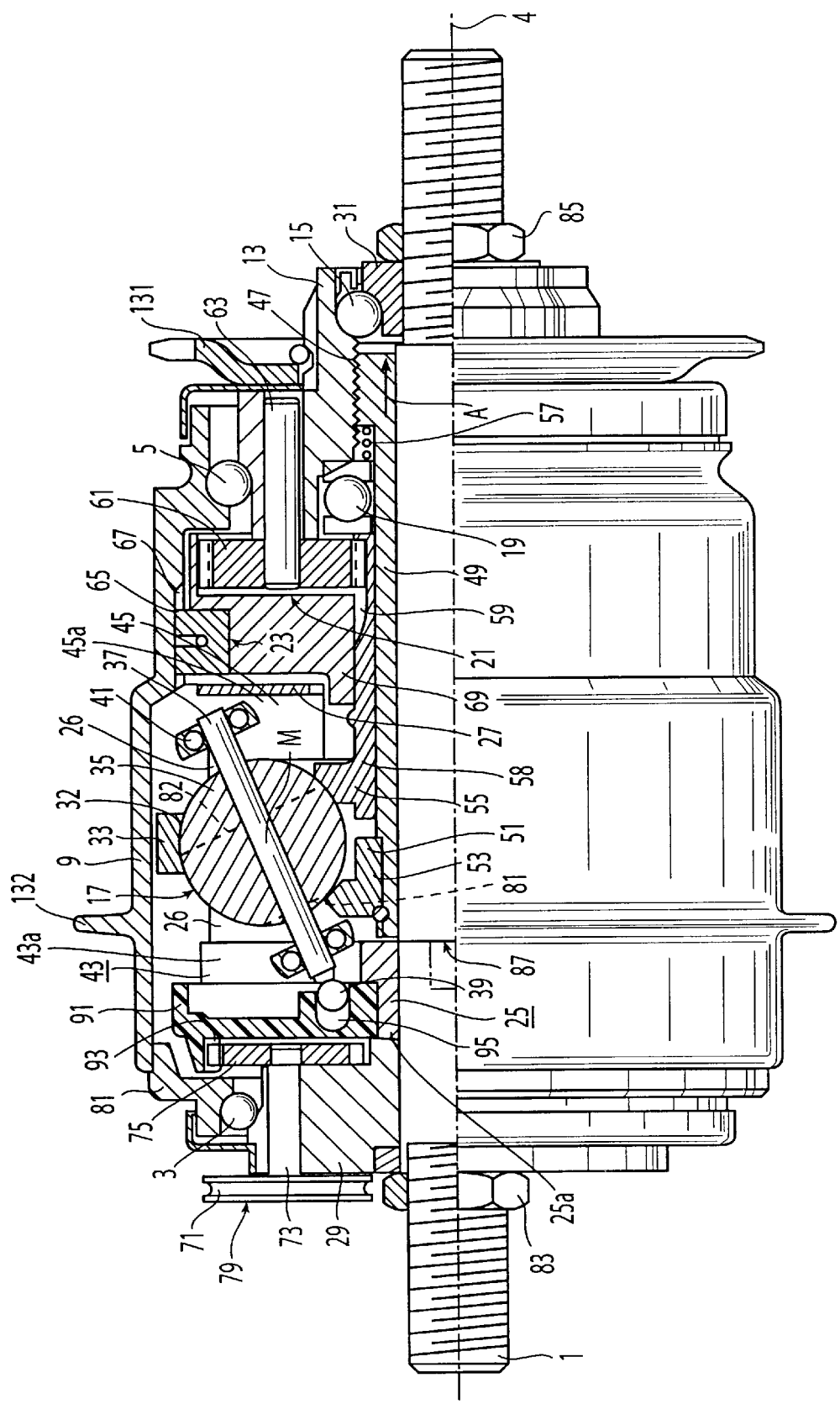
FIG. 10 is a cross-sectional view of an infinitely-variable transmission which comprises part of an alternative embodiment of the present invention.

In the already-mentioned unit formed of the ball carrier plates 25 and 27 a number of balls 35 are arranged along a circle central to the axis 4 and situated in a radial plane. The axle-pin ends of the ball axles 37 protruding over the periphery of the balls are secured over the ball bearings 41 in the grooves 43 and 45 of the ball carrier plates 25 and 27 in such a manner that they can move only in a radial plane defined by the longitudinal direction of the groove and containing the axis 4. The number of balls is at least three and optimally between four and six, there being just as many radial grooves 43 and 45 in the ball carrier plates 25 and 27. The grooves 43 and 45 guide with their flanks 43a and 45a the ball bearings 41 which are mounted on the ends of the axle pins of the ball axles 37. For reasons of a small dead travel when switching from one direction of rotation to the other, the grooves 43 and 45 have a width which corresponds to the diameter of the ball bearings 41 plus a small movement play. As a result of the arrangement of the oppositely-placed radial grooves 43 and 45 in the rigidly screwed connection of the parts 25 and 27, both ball bearings 41 and therefore also the axle pins move in planes which all intersect a the center of the axle 4. The swivelling of these axle pins produces in a known manner, through the modification of the distances of the points of contact of the parts 33, 51 and 55 participating in the friction gear from the center line of the axle pins 37, an alteration of the speed difference between the drive ring 51 and driven ring 55 which difference becomes zero on the parallel coaxial position of the axle pins 37 relative to the axle 4 of the transmission. In FIG. 10 there are respectively indicated by means of a broken line the rather small circle of contact B1 between the drive ring 53 and the ball 35 for the represented inclination of the ball axis 37, as well as the relatively great circle of contact B2 between the driven ring 55 and the ball 35. The transmission ratio of the ball friction gear 17, and thus the speed differential between the second auxiliary sprocket 131 and the third auxiliary sprocket 132, corresponds to the diameter ratio of the contact circles B1 and B2.

The swivelling of the ball axles 37 is effected by means of a control device 79 which can be adjusted by the bicycle rider, for example using cable pulls and a hand lever not shown here. Here, a control wheel 71 is rotated which transmits this rotational control movement via a control axle 73 to a toothed wheel 75 which cooperates with a ring gear 93 of a crank wheel 91 and can adjust this in both directions of rotation with reduced angle velocity of crank wheel 91 as compared with the control wheel 71. In this connection it is of no consequence whether the user moves the control wheel actively in both directions of only in one direction, and leaves the resetting to a return spring mounted in the cable pull.

As FIG. 10 shows, the crank wheel 91 is rotatably mounted on a shoulder 25a of the ball carrier plate 25 on the control side, rigidly secured to the axle. It has, on the second auxiliary gear side surface, several guide grooves 95 provided in spiral form, into which there engage ball projections 39 which are integrally connected with the respective pins of the ball axles 37. The guide grooves 95 have a width which is only slightly greater than the diameter of the ball projections 39 to keep down the dead travel occurring between the two directions of engagement.

Actuation of the control device causes the rotation of the toothed wheel 75 and therefore the crank wheel 91, thereby shifting the ball projections 39 radially outward and the ball axles in FIG. 10 are swivelled clockwise around the ball center point M. By this means the transmission ratio in the friction gear 17, and thus the speed differential between the second auxiliary sprocket 131 and the third auxiliary sprocket 132, is varied.

Regardless of whether a simple axle or a transmission links the second auxiliary sprocket 131 to the third auxiliary sprocket 132, the third auxiliary sprocket 132 is linked via a second chain 134 to a fourth auxiliary sprocket 135 as shown in FIGS. 1a–2b. As shown in FIGS. 4-5, the fourth auxiliary sprocket 135 rotates around first axis A. The fourth auxiliary sprocket 135, however, rotates independently of the first auxiliary sprocket 125 and first axle 126. The fourth auxiliary sprocket 135 is fixably attached to the main sprocket 136, which also rotates around first axis A independently of the first auxiliary sprocket 125 and first axle 126. The fourth auxiliary sprocket 135 and the main sprocket 136 rotate together about first axis A on second bearings 138, 138'.

Although the fourth auxiliary gear shown in FIGS. 1a–5 is of the same circumference as the third auxiliary gear, it may be beneficial to provide a fourth auxiliary sprocket which is smaller than the third auxiliary sprocket. As explained in more detail below, this difference in circumferences further enhances the gear ratio of the drive system. In the preferred embodiment of the present invention, the auxiliary sprocket sizes are chosen such that the first and third auxiliary sprockets are of equal size and the second and fourth auxiliary sprockets are also of equal size, but the second and fourth auxiliary sprockets are of a smaller circumference than the first and third auxiliary sprockets. By selecting a smaller size for the second and fourth auxiliary sprockets, the rider achieves a first "gearing-up," or speed increase, between the first and second auxiliary sprockets, and a second speed increase between the third and fourth auxiliary sprockets. Finally, there is a speed increase between the main sprocket and the drive sprocket, as is commonly known to those skilled in the art.

It is desirable for the first and third auxiliary sprockets to be of equal size and the second and fourth auxiliary sprockets to be of equal size so that the first and second chains will be of equal length and tension. This feature makes replacing the auxiliary sprockets to adjust the performance of the bicycle very easy for the user. As shown in FIGS. 4–7, the axle 133 which couple the second and third auxiliary gears is contained in an adjustment housing 137 which has an eccentric or elliptical cross-section. When a nut or fastener is loosened, it is possible to rotate this elliptically-shaped housing 137 within the cylindrical tube 129 which contains the housing and the axle. Rotation of this housing allows the adjustment of the distance between axis A, about which the first and fourth auxiliary sprockets rotate, and axis B, about which the second and third auxiliary cogs rotate. Shortening this distance decreases the tension of the first and second chains, while increasing the distance increases the tension in the first and second chains. In order to change the auxiliary sprockets, the nut or fastener holding the adjustable housing in place in the tube 129 is loosened. Then, the housing 137 is rotated to loosen the first and second chains.

With the first and second chains slack, some or all of the auxiliary sprockets may be removed and replaced. The housing 137 is then rotated until the desired tension is obtained in the first and second chains, and then the housing is re-fastened within the tube 129. It is important to note that the desired position of the housing 137 will change depending on the sizes of the auxiliary sprockets, so this easily-adjustable system allows a wide variety of sprocket sizes to be used. As mentioned above, the first and second chains will be of the same length and tension if the auxiliary sprocket sizes are chosen properly. It is important to note that, during this entire procedure, the main sprocket, the drive sprocket, and the third chain remained fixed to the bicycle, and these parts are compatible with any combination of auxiliary sprockets that the user chooses to install.

Reference is now made to some specific examples of the present invention. If the circumference of the drive sprocket is kept constant, the overall "gear ratio" or mechanical advantage of the drive system may be expressed in terms of the circumference of the main sprocket, since as the main sprocket increases in circumference, the gear ratio will increase linearly with it. Furthermore, the circumference of the main sprocket is commonly represented in the art by the number of gear teeth on the circumference of the sprocket. The distance between the teeth is constant for all sprocket sizes, since the distance between the links in a bicycle chain is constant.

Thus, the effectiveness of the present invention can be seen in the examples set forth in the following table (TABLE 1). In each case, the main sprocket has thirty-two teeth. By varying the relative sizes of the intermediate sprockets, however, a higher overall gear ratio can be achieved, causing the bicycle to perform as though the main sprocket had a greater number of teeth and a greater circumference. The following table illustrates the number of main sprocket teeth that would be required in each case to achieve a gear ratio equivalent to that produced by the multi-sprocket assembly of the present invention. For instance, in the first example, the first and third auxiliary sprockets have the same number of teeth (fifteen) as the second and fourth auxiliary sprockets, thus there is no gearing up effect and the main sprocket has an equivalent teeth number of thirty-two. In the last example, however, there is a nine-tooth drop (from 24 to 15) between the first and second auxiliary sprockets, and another nine-tooth drop (again from 24 to 15) between the third and fourth auxiliary sprockets. This gives the drive apparatus an equivalent main sprocket size of 81.9 teeth, which is an increase of approximately 2.56 times over the actual main sprocket circumference of thirty-two teeth. Thus, in a standard two-sprocket bicycle drive system, a main sprocket having eighty-two teeth would have a radius more than 2.5 times larger than a sprocket having 32 teeth, which would substantially interfere with the design of the bicycle.

TABLE 1

EQUIVALENT MAIN SPROCKET CIRCUMFERENCE
(NUMBER OF TEETH) FOR VARIOUS AUXILIARY GEAR SIZES

ZERO-TOOTH DIFFERENCE:

| | | | |
|---|---|---|---|
| First Aux. Sprocket (teeth) | 15 | 16 | 17 |
| Second Aux. Sprocket (teeth) | 15 | 16 | 17 |
| Third Aux. Sprocket (teeth) | 15 | 16 | 17 |
| Fourth Aux. Sprocket (teeth) | 15 | 16 | 17 |
| Main Sprocket Actual Circ. (teeth) | 32 | 32 | 32 |
| Main Sprocket Equiv. Circ. (teeth) | 32 | 32 | 32 |
| Chain Length (links) | 32 | 32 | 32 |
| Center-to-Center Distance (inches) | 4.3 | 4.0 | 4.3 |

ONE-TOOTH DIFFERENCE:

| | | | | | | | | | |
|---|---|---|---|---|---|---|---|---|---|
| First Aux. Sprocket (teeth) | 16 | 17 | 18 | 19 | 20 | 21 | 22 | 23 | 24 |
| Second Aux. Sprocket (teeth) | 15 | 16 | 17 | 18 | 19 | 20 | 21 | 22 | 23 |
| Third Aux. Sprocket (teeth) | 16 | 17 | 18 | 19 | 20 | 21 | 22 | 23 | 24 |
| Fourth Aux. Sprocket (teeth) | 15 | 16 | 17 | 18 | 19 | 20 | 21 | 22 | 23 |
| Main Sprocket Actual Circ. (teeth) | 32 | 32 | 32 | 32 | 32 | 32 | 32 | 32 | 32 |
| Main Sprocket Equiv. Circ. (teeth) | 36.4 | 36.1 | 35.9 | 35.7 | 35.5 | 35.3 | 35.1 | 35.0 | 34.8 |
| Chain Length (links) | 32 | 32 | 34 | 34 | 36 | 36 | 38 | 38 | 40 |
| Center-to-Center Distance | 4.1 | 3.9 | 4.1 | 3.9 | 4.1 | 3.9 | 4.1 | 3.9 | 4.1 |

TABLE 1-continued

EQUIVALENT MAIN SPROCKET CIRCUMFERENCE (NUMBER OF TEETH) FOR VARIOUS AUXILIARY GEAR SIZES (inches)

TWO-TOOTH DIFFERENCE:

| | | | | | | | | |
|---|---|---|---|---|---|---|---|---|
| First Aux. Sprocket (teeth) | 17 | 18 | 19 | 20 | 21 | 22 | 23 | 24 |
| Second Aux. Sprocket (teeth) | 15 | 16 | 17 | 18 | 19 | 20 | 21 | 22 |
| Third Aux. Sprocket (teeth) | 17 | 18 | 19 | 20 | 21 | 22 | 23 | 24 |
| Fourth Aux. Sprocket (teeth) | 15 | 16 | 17 | 18 | 19 | 20 | 21 | 22 |
| Main Sprocket Actual Circ. (teeth) | 32 | 32 | 32 | 32 | 32 | 32 | 32 | 32 |
| Main Sprocket Equiv. Circ. (teeth) | 41.1 | 40.5 | 40.0 | 39.5 | 39.1 | 38.7 | 38.4 | 38.1 |
| Chain Length (links) | 32 | 34 | 34 | 36 | 36 | 38 | 38 | 40 |
| Center-to-Center Distance (inches) | 4.0 | 4.2 | 4.0 | 4.2 | 4.0 | 4.2 | 4.0 | 4.2 |

THREE-TOOTH DIFFERENCE:

| | | | | | | | |
|---|---|---|---|---|---|---|---|
| First Aux. Sprocket (teeth) | 18 | 19 | 20 | 21 | 22 | 23 | 24 |
| Second Aux. Sprocket (teeth) | 15 | 16 | 17 | 18 | 19 | 20 | 21 |
| Third Aux. Sprocket (teeth) | 18 | 19 | 20 | 21 | 22 | 23 | 24 |
| Fourth Aux. Sprocket (teeth) | 15 | 16 | 17 | 18 | 19 | 20 | 21 |
| Main Sprocket Actual Circ. (teeth) | 32 | 32 | 32 | 32 | 32 | 32 | 32 |
| Main Sprocket Equiv. Circ. (teeth) | 46.1 | 45.1 | 44.3 | 43.6 | 42.9 | 42.3 | 41.8 |
| Chain Length (links) | 32 | 34 | 34 | 36 | 36 | 38 | 38 |
| Center-to-Center Distance (inches) | 3.9 | 4.1 | 3.9 | 4.1 | 3.9 | 4.1 | 3.9 |

FOUR-TOOTH DIFFERENCE:

| | | | | | | |
|---|---|---|---|---|---|---|
| First Aux. Sprocket (teeth) | 19 | 20 | 21 | 22 | 23 | 24 |
| Second Aux. Sprocket (teeth) | 15 | 16 | 17 | 18 | 19 | 20 |
| Third Aux. Sprocket (teeth) | 19 | 20 | 21 | 22 | 23 | 24 |
| Fourth Aux. Sprocket (teeth) | 15 | 16 | 17 | 18 | 19 | 20 |
| Main Sprocket Actual Circ (teeth) | 32 | 32 | 32 | 32 | 32 | 32 |
| Main Spracket Equiv. Circ. (teeth) | 51.3 | 50.0 | 48.8 | 47.8 | 46.9 | 46.1 |
| Chain Length (links) | 34 | 34 | 36 | 36 | 38 | 38 |
| Center-to-Center Distance (inches) | 4.2 | 4.0 | 4.2 | 4.0 | 4.2 | 4.0 |

FIVE-TOOTH DIFFERENCE:

| | | | | | |
|---|---|---|---|---|---|
| First Aux. Sprocket (teeth) | 20 | 21 | 22 | 23 | 24 |
| Second Aux. Sprocket (teeth) | 15 | 16 | 17 | 18 | 19 |
| Third Aux. Sprocket (teeth) | 20 | 21 | 22 | 23 | 24 |
| Fourth Aux. Sprocket (teeth) | 15 | 16 | 17 | 18 | 19 |
| Main Sprocket Actual Circ. (teeth) | 32 | 32 | 32 | 32 | 32 |
| Main Sprocket Equiv. Circ. (teeth) | 56.9 | 55.1 | 53.6 | 52.2 | 51.1 |
| Chain Length (links) | 34 | 34 | 36 | 36 | 38 |
| Center-to-Center Distance (inches) | 4.1 | 3.9 | 4.1 | 3.9 | 4.1 |

SIX-TOOTH DIFFERENCE:

| | | | | |
|---|---|---|---|---|
| First Aux. Sprocket (teeth) | 21 | 22 | 23 | 24 |
| Second Aux. Sprocket (teeth) | 15 | 16 | 17 | 18 |
| Third Aux. Sprocket (teeth) | 21 | 22 | 23 | 24 |
| Fourth Aux. Sprocket (teeth) | 15 | 16 | 17 | 18 |
| Main Sprocket Actual Circ. (teeth) | 32 | 32 | 32 | 32 |
| Main Sprocket Equiv. Circ. (teeth) | 62.7 | 60.5 | 58.6 | 56.9 |
| Chain Length (links) | 34 | 36 | 36 | 38 |
| Center-to-Center Distance (inches) | 4.0 | 4.2 | 4.0 | 4.0 |

SEVEN-TOOTH DIFFERENCE:

| | | | |
|---|---|---|---|
| First Aux. Sprocket (teeth) | 22 | 23 | 22 |
| Second Aux. Sprocket (teeth) | 15 | 16 | 15 |
| Third Aux. Sprocket (teeth) | 22 | 23 | 22 |
| Fourth Aux. Sprocket (teeth) | 15 | 16 | 15 |
| Main Sprocket Actual Circ. (teeth) | 32 | 32 | 32 |
| Main Sproaket Equiv. Circ. (teeth) | 68.8 | 66.1 | 63.8 |
| Chain Length (links) | 34 | 26 | 36 |
| Center-to-Center Distance (inches) | 3.8 | 4.1 | 3.8 |

EIGHT-TOOTH DIFFERENCE:

| | | |
|---|---|---|
| First Aux. Sprocket (teeth) | 23 | 24 |
| Second Aux. Sprocket (teeth) | 15 | 16 |
| Third Aux. Sprocket (teeth) | 23 | 24 |
| Fourth Aux. Sprocket (teeth) | 15 | 16 |
| Main Sprocket Actual Circ. (teeth) | 32 | 32 |
| Main Sprocket Equiv. Circ. (teeth) | 75.2 | 72.0 |
| Chain Length (links) | 36 | 36 |
| Center-to-Center Distance (inches) | 4.2 | 4.0 |

NINE-TOOTH DIFFERENCE:

| | |
|---|---|
| First Aux. Sprocket (teeth) | 24 |
| Second Aux. Sprocket (teeth) | 15 |
| Third Aux. Sprocket (teeth) | 24 |
| Fourth Aux. Sprocket (teeth) | 15 |
| Main Sprocket Actual Circ. (teeth) | 32 |
| Main Sprocket Equiv. Circ. (teeth) | 81.9 |
| Chain Length (links) | 36 |
| Center-to-Center Distance (inches) | 4.0 |

Thus, the auxiliary sprockets can be sized to create an effective sprocket size such that the primary (main) sprocket to effective sprocket teeth ratio is in the range of approximately 1:1 to approximately 1:3. As seen above, by using matched sprockets having the same number of teeth (TABLE 1,"ZERO-TOOTH DIFFERENCE"), the number of effective effective sprocket teeth is the same as the number of actual primary sprocket teeth. However, when the first and third auxiliary sprockets have 9 more teeth than the second and fourth auxiliary sprockets (TABLE 1,"NINE-TOOTH DIFFERENCE"), the primary sprocket acts as an effective sprocket having almost three times the number of teeth, or there is approximately a 1:3 ratio between the number of primary (actual) sprocket teeth and the number of effective sprocket teeth. Moreover, by reversing the positions first and second auxiliary sprockets and the third and fourth auxiliary sprockets in the examples above, the primary sprocket having 32 teeth can be "geared down", or rotated at a slower speed, to act as an equivalent sprocket having between 32 teeth and 1 tooth. Thus, in this example alone, the auxiliary sprockets can be sized to yield an effective sprocket having between 1 and 82 teeth, all for the same 32-tooth primary (main) sprocket.

It is important to note that in each of the above examples, the size of the main sprocket and the distance between the main sprocket and the drive sprocket remain constant, and thus the overall design of the bicycle is not affected. Also, the bicycle user can quickly and easily change remove and replace the auxiliary sprockets to change the overall gear ratio of the bicycle's drive system, without interfering with the main sprocket, the drive sprocket, or the third chain, since the sizes and relative positions of these critical components do not vary when the auxiliary sprockets are changed.

While it is apparent that the invention herein disclosed is well calculated to fulfill the objects above stated, it will be appreciated that numerous modifications and embodiments may be devised by those skilled in the art. It is intended that the appended claims cover all such modifications and embodiments as fall within the true spirit and scope of the present invention.

What is claimed is:

1. A bicycle comprising a frame, at least a rear wheel coupled to the frame, and a drive system, the drive system comprising:

two pedals, each pedal being attached to a crank arm, the crank arms being coupled to a first axle mounted on the frame;

a first auxiliary sprocket coupled to the crank axle;

a first chain linking the first auxiliary sprocket to a second auxiliary sprocket;

a third auxiliary sprocket coupled to the second auxiliary sprocket;

a second chain linking the third auxiliary sprocket to a fourth auxiliary sprocket;

a main sprocket coupled to the fourth auxiliary sprocket;

a third chain linking the main sprocket to a drive sprocket, said drive sprocket being coupled to the rear wheel; and wherein the fourth auxiliary sprocket is located coaxially with the first auxiliary sprocket.

2. The bicycle according to claim 1 wherein the main sprocket is located coaxially with the first auxiliary sprocket.

3. A bicycle comprising a frame, at least a rear wheel coupled to the frame, and a drive system, the drive system comprising:

two pedals, each pedal being attached to a crank arm, the crank arms being coupled to a first axle mounted on the frame;

a first auxiliary sprocket coupled to the crank axle;

a first chain linking the first auxiliary sprocket to a second auxiliary sprocket;

a third auxiliary sprocket coupled to the second auxiliary sprocket;

a second chain linking the third auxiliary sprocket to a fourth auxiliary sprocket;

a main sprocket coupled to the fourth auxiliary sprocket;

a third chain linking the main sprocket to a drive sprocket, said drive sprocket being coupled to the rear wheel;

wherein the second auxiliary sprocket is coupled to the third auxiliary sprocket by a transmission having at least one gear ratio; and where the transmission is discretely adjustable, having a finite number of gear ratios.

4. A bicycle comprising a frame, at least a rear wheel coupled to the frame, and a drive system, the drive system comprising:

two pedals, each pedal being attached to a crank arm, the crank arms being coupled to a first axle mounted on the frame;

a first auxiliary sprocket coupled to the crank axle;

a first chain linking the first auxiliary sprocket to a second auxiliary sprocket;

a third auxiliary sprocket coupled to the second auxiliary sprocket;

a second chain linking the third auxiliary sprocket to a fourth auxiliary sprocket;

a main sprocket coupled to the fourth auxiliary sprocket;

a third chain linking the main sprocket to a drive sprocket, said drive sprocket being coupled to the rear wheel;

wherein the second auxiliary sprocket is coupled to the third auxiliary sprocket by a transmission having at least one gear ratio;

wherein the transmission is discretely adjustable, having a finite number of gear ratios; and wherein the transmission is continuously adjustable, having an infinite number of gear ratios.

5. A crank assembly for a bicycle for providing power to the front or rear wheel of the bicycle, the crank assembly comprising:

two crank arms for receiving power from a rider;

a main sprocket for providing power from the crank arms to a wheel of a bicycle;

a plurality of matched sprockets coupled between the crank arms and the main sprocket for altering rotational speed of the main sprocket;

wherein the plurality of matched sprockets is comprised of four auxiliary sprockets, the first and third auxiliary sprockets having a same number of teeth and the second and fourth auxiliary sprockets having a same number of teeth; and wherein the crank arms, the main sprocket and the first and fourth auxiliary sprockets are mounted to a bicycle on a first hub and the second and third auxiliary sprockets are mounted to the bicycle on a second hub.

6. The crank assembly according to claim 5, wherein the second and third auxiliary sprockets are coupled together via a transmission having more than one gear ratio mounted in the second hub.

7. A bicycle comprising a frame, at least a rear wheel coupled to the frame, and a drive system comprising:

two pedals, each pedal being attached to a crank arm, the crank arms being coupled to a first axle mounted on the frame;

a first auxiliary sprocket coupled to the crank axle;

a first chain linking the first auxiliary sprocket to a second auxiliary sprocket;

a third auxiliary sprocket coupled to the second auxiliary sprocket;

a second chain linking the third auxiliary sprocket to a fourth auxiliary sprocket;

a main sprocket coupled to the fourth auxiliary sprocket;

a third chain linking the main sprocket to a drive sprocket, said drive sprocket being coupled to the rear wheel;

wherein the first auxiliary sprocket and the third auxiliary sprocket are of substantially equal circumference;

wherein the second auxiliary sprocket and the fourth auxiliary sprocket are of a substantially equal circumference;

wherein the first auxiliary sprocket has a greater circumference than the second auxiliary sprocket; and wherein the fourth auxiliary sprocket is located coaxially with the first auxiliary sprocket.

* * * * *

UNITED STATES PATENT AND TRADEMARK OFFICE
CERTIFICATE OF CORRECTION

PATENT NO.    :  5,979,924

DATED         :  November 9, 1999

INVENTOR(S)   :  D'Aluisio et al.

It is certified that error appears in the above-identified patent and that said Letters Patent is hereby corrected as shown below:

TITLE PAGE, [73] Assignee:

Please change "Cannoncale Corporation to --Cannondale Corporation-- .

Signed and Sealed this

Twenty-second Day of August, 2000

Attest:

Attesting Officer

Q. TODD DICKINSON
Director of Patents and Trademarks